United States Patent
Silver et al.

(10) Patent No.: US 10,860,397 B1
(45) Date of Patent: Dec. 8, 2020

(54) COMMUNICATION OF DATA BETWEEN SOFTWARE APPLICATIONS

(71) Applicant: Amazon Technologies, Inc., Seattle, WA (US)

(72) Inventors: Brian Robert Silver, Austin, TX (US); Kun Xu, Austin, TX (US); Alwood Patrick Williams, Spicewood, TX (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/297,467

(22) Filed: Mar. 8, 2019

(51) Int. Cl.
| | | |
|---|---|---|
| *H04L 7/00* | (2006.01) | |
| *G06F 9/54* | (2006.01) | |
| *G06F 9/50* | (2006.01) | |

(52) U.S. Cl.
CPC ............ *G06F 9/544* (2013.01); *G06F 9/5016* (2013.01); *G06F 9/5027* (2013.01)

(58) Field of Classification Search
CPC ....... G06F 9/544; G06F 9/5016; G06F 9/5027
See application file for complete search history.

(56) References Cited

U.S. PATENT DOCUMENTS

| | | | | |
|---|---|---|---|---|
| 6,154,785 A | * | 11/2000 | Lakhat | G06F 15/163 709/234 |
| 2006/0004982 A1 | * | 1/2006 | Matheny | G06F 12/0292 711/202 |
| 2018/0357176 A1 | * | 12/2018 | Wang | G06F 9/544 |
| 2020/0034186 A1 | * | 1/2020 | Sanghi | G06F 9/544 |

* cited by examiner

*Primary Examiner* — Doon Y Chow
*Assistant Examiner* — Abdou K Seye
(74) *Attorney, Agent, or Firm* — Kilpatrick Townsend & Stockton LLP

(57) ABSTRACT

A computer system has a memory configured for sharing data between a first application and a second application. The memory includes a metadata region and a data region. The metadata region includes metadata that indicates how data being communicated between the first application and the second application is to be interpreted. The metadata also indicates whether the data can be found in the metadata itself or in a particular location in the data region. Each application can be assigned its own memory location containing a flag that can be set in order to indicate to the other application that the memory is ready to be accessed by the other application. The memory location can be implemented using a hardware register or in memory, either the same memory that includes the metadata and data regions or on a separate memory.

16 Claims, 12 Drawing Sheets

1200

```
┌─────────────────────────────────────────────┐
│  Configuring, by a first application         │
│  executing on a computer system, a memory    │
│  for communicating data between the first    │
│  application and a second application        │
│  executing on the computer system, the       │
│  configuring including writing metadata to   │
│  a metadata region of a memory, the          │
│  metadata indicating that the data can be    │
│  found in the metadata itself or in a first  │
│  location in a data region of the memory,    │
│  the metadata further indicating how the     │
│  data is to be interpreted by the first      │
│  application and the second application      │
│                    1202                      │
└─────────────────────────────────────────────┘
                      │
                      ▼
┌─────────────────────────────────────────────┐
│  After writing the metadata, setting a       │
│  first flag in a memory location assigned    │
│  to the first application, the setting of    │
│  the first flag indicating to the second     │
│  application that the memory is ready to be  │
│  accessed by the second application, and     │
│  the setting of the first flag causing the   │
│  second application to read the data from    │
│  or write the data to the memory based on    │
│  the metadata                                │
│                    1204                      │
└─────────────────────────────────────────────┘
                      │
                      ▼
┌─────────────────────────────────────────────┐
│  Receiving, by the first application, an     │
│  indication that the second application has  │
│  finished reading or writing the data,       │
│  wherein the indication is based on setting  │
│  of a second flag in a memory location       │
│  assigned to the second application          │
│                    1206                      │
└─────────────────────────────────────────────┘
```

COMMUNICATION OF DATA BETWEEN SOFTWARE APPLICATIONS

BACKGROUND

In some computing environments, multiple software applications execute concurrently and communicate with each other at various times. If the software applications are supplied by the same source (e.g., the same software developer), security is of lesser concern than when the applications are from different sources. However, if, for example, applications are not from the same source, the applications may not trust each other. For example, a first application running on a computing device may be supplied by a manufacturer of the computing device and may need to communicate with a device driver that controls a peripheral component that is part of, or communicatively coupled to, the computing device. Since device drivers are often supplied by third-party software developers, it may be desirable for security reasons to limit the ability of a device driver to access data used by the first application.

One way to enable data communication while limiting access by an untrusted application is to allocate a portion of memory as a shared storage space for use by the first (e.g., trusted) application and the untrusted application. Data communicated between the two applications is written to this shared storage space. The shared storage space is usually static in size and does not make efficient use of the memory since there may be times when an amount of data larger than the shared storage space needs to be communicated between the two applications. Another way to communicate data is through direct transmission of the data from one application to another, for example, over a network. However, direct transmission consumes computing resources that could be used for other operations and adds to the complexity of algorithms used for sending and receiving data.

BRIEF DESCRIPTION OF THE DRAWINGS

Various embodiments in accordance with the present disclosure will be described with reference to the drawings, in which:

FIG. 12 is a flow diagram of an example process for communicating data between applications.

DETAILED DESCRIPTION

Figure 1:
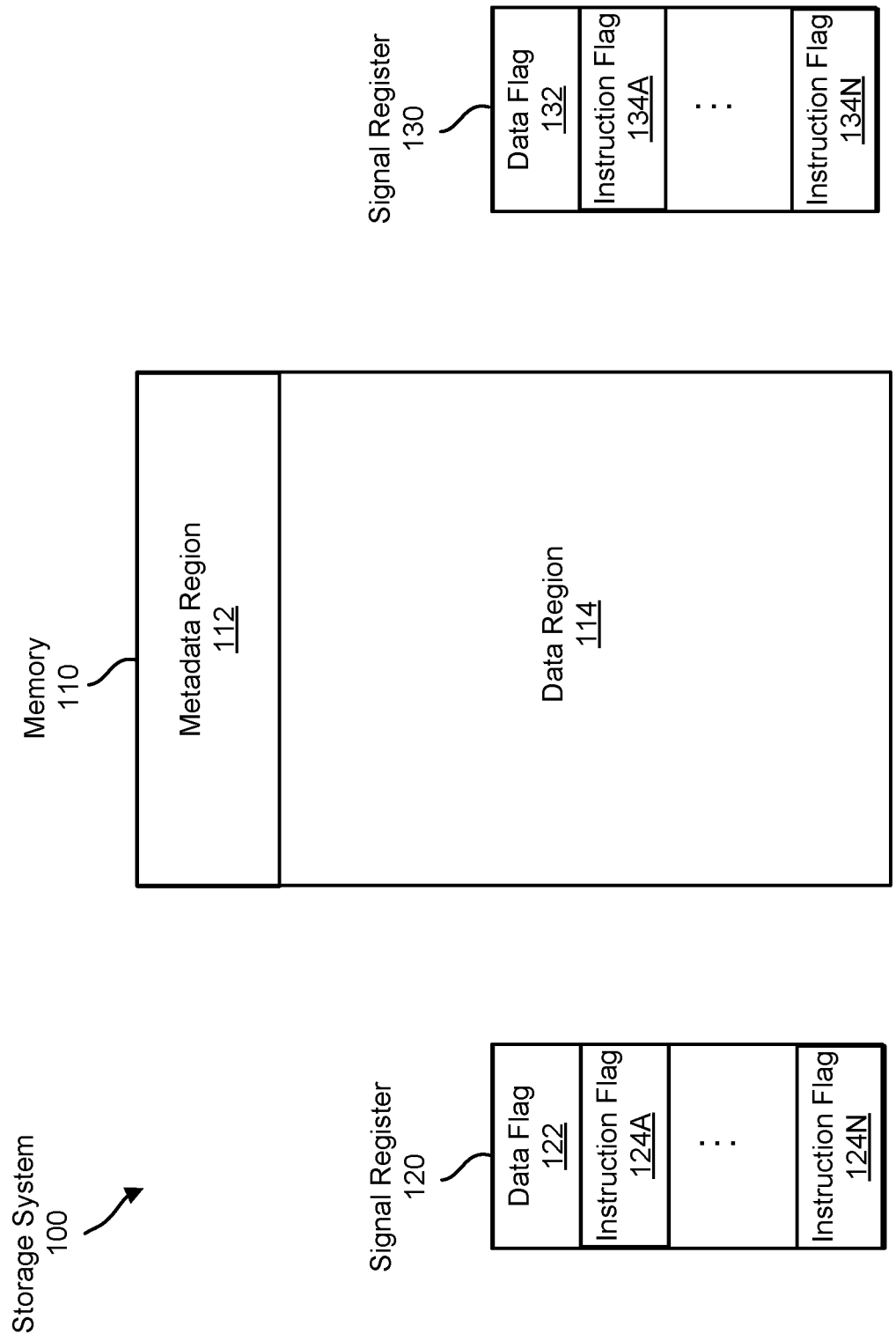
FIG. 1 is a block diagram of an example storage system usable for communicating data between applications.

A computer system can include a first software application and a second software application that are executed concurrently on one or more processors of the computer system. To facilitate communication of data between the first software application and the second software application, the computer system can include a memory divided into a metadata region and a data region. The memory can reside in one or more computing devices of the computer system. For example, the memory can be a single block of random access memory (RAM). Alternatively, the memory can be formed of multiple physical memory units located on the same computing device or on different computing devices.

The data region can be configured as a shared memory space that is made available to both software applications for writing and reading data. The data region operates similarly to a data buffer. The amount of space available in the data region for storing data can be dynamically configured by one or more of the software applications (e.g., the first application). This enables the data region to be utilized efficiently, for example, according to the amount of data the first application needs to send to or receive from the second application. In this respect, the shared memory space can be viewed as a data pipeline of variable bandwidth. Depending on the configuration of the memory, the data region may be accessed by one application at a time or by both applications simultaneously. In a half-duplex configuration, data can only be transmitted in one direction at any given time. In a full-duplex configuration, the data region can be divided into sub-regions that enable simultaneous transmission in both directions. For instance, a first sub-region may contain data being sent from a first application to a second application, while a second sub-region contains data being sent from the second application to the first application.

Metadata can convey information that enables the data in the data region to be accessed (e.g., read or written) and processed in an appropriate manner. In some embodiments, the metadata includes key-value pairs, where a key provides semantic information for data in the data region and the value indicates where the data is located (e.g., a particular memory address or range of memory addresses in the shared memory). Thus, the metadata can operate as a table of contents for the data. Each application can be configured with information on what keys to expect. For example, the first application and the second application may each be configured with a set of agreed-upon keys, which can be specified as part of the program code of the first and second applications.

Although not strictly necessary, the metadata region can be located in a secure space that is readable and writeable by the application that configures the data region (e.g., the first application), but read-only for the other software application (e.g., the second application). This would enable the application that configures the data region to control, through appropriate setting of the metadata, what types of data are written to the shared memory, how much data is written, and which memory locations are written to. Placement of the metadata region in a secure space can be useful when the other software application is an untrusted application such as a third-party device driver.

The computer system can further include a first signal register assigned to the first application and a second signal register assigned to the second application. The signal registers can be implemented as hardware registers associated with one or more processors on which the first and second applications are executed. By setting a flag in its assigned register, each application can signal to the other application that the memory is ready to be accessed by the other application. The flag can, for example, trigger an interrupt that causes the accessing application to examine the metadata in the metadata region to determine the location of the data and the meaning of the data. The accessing application can then read or write the data as appropriate based on the metadata. In this manner, the registers can be used for synchronized communication of data between applications. In some embodiments, the signal registers can be implemented in memory, either the same memory that stores the data being communicated between applications, or a separate memory. Additionally, interrupts can be replaced with polling of the signal registers by the applications.

Various types of data can be communicated between applications using a shared memory. For example, the data written to the data region can include device configuration information for one or more computing devices of the computer system. As another example, the data may include error information generated during execution of one application. In some instances, the data can identify a location in another memory where additional data is to be read or written (e.g., the data may point to a particular block of memory in a computing device). Further, the shared memory can be used for different purposes at different times. For instance, the shared memory can be used for communicating device configuration information during boot-up of the computer system. Following boot-up, the shared memory can be used to communicate data generated during execution of the applications (e.g., error information).

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 is a block diagram of an example storage system 100 usable for communicating data between applications. The storage system 100 includes a memory 110, a first signal register 120, and a second signal register 130. The storage system 100 can be implemented on a computer system such as the computer system depicted in FIG. 2. The components of the storage system 100 can be co-located or distributed across multiple computing devices. In one implementation, the memory 110 is a contiguous block of memory addresses in RAM, with a metadata region 112 immediately followed by a data region 114. However, the metadata region 112 and the data region 114 can have discontinuous address ranges, as illustrated in FIG. 3. The metadata region 112 and the data region 114 can even be located on different physical memory units.

The metadata region 112 is a portion of the memory 110 that contains metadata about data in the data region 114. In one implementation, the metadata is formatted as key-value pairs. Keys can be agreed upon in advance of writing data to the data region 114 and can be used to indicate the semantic meaning of the data, in particular, how the data is to be interpreted by the applications. For example, a key can describe an attribute of the data (e.g., a data type). In some instances, an application may infer, based on the metadata, how the data is structured. For example, an application can be configured to recognize that data described as corresponding to a particular device configuration is formatted in a certain way. The metadata can also indicate that the data is data being sent or data being received. Each application that needs to access the memory 110 can be configured with information about a set of keys that can potentially be written to the metadata region 112. Applications can be preconfigured with key information, for example, based on an agreement between software developers. Thus, key information can be built into the program code of the applications. Alternatively, applications may engage in a negotiation process in which the applications collectively decide, prior to using the memory 110 to communicate with each other, which keys can be used and what those keys represent.

Figure 3:
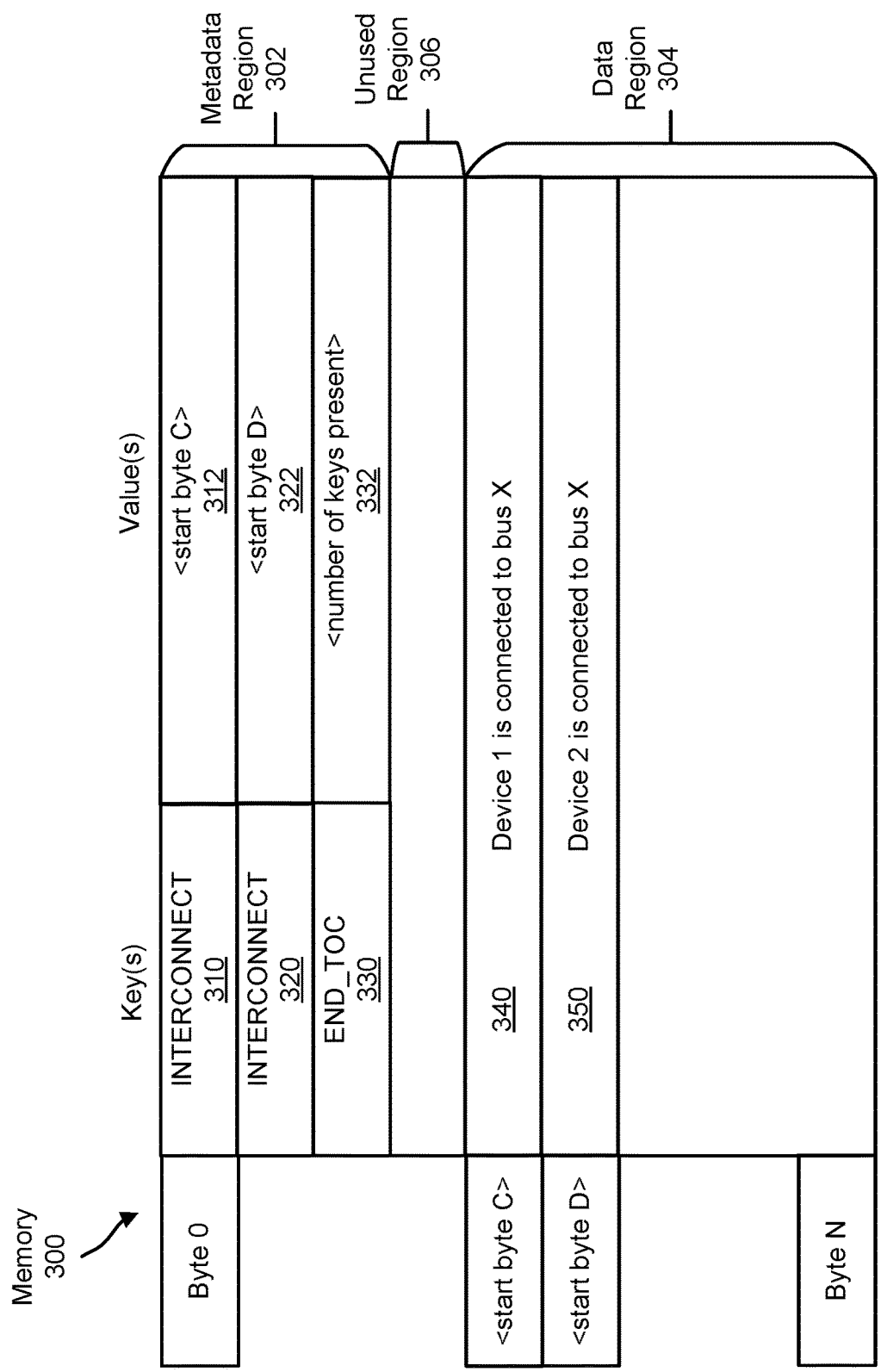
FIGS. 3 and 4 illustrate memories configured for communicating device configuration information between applications.
Figure 4:
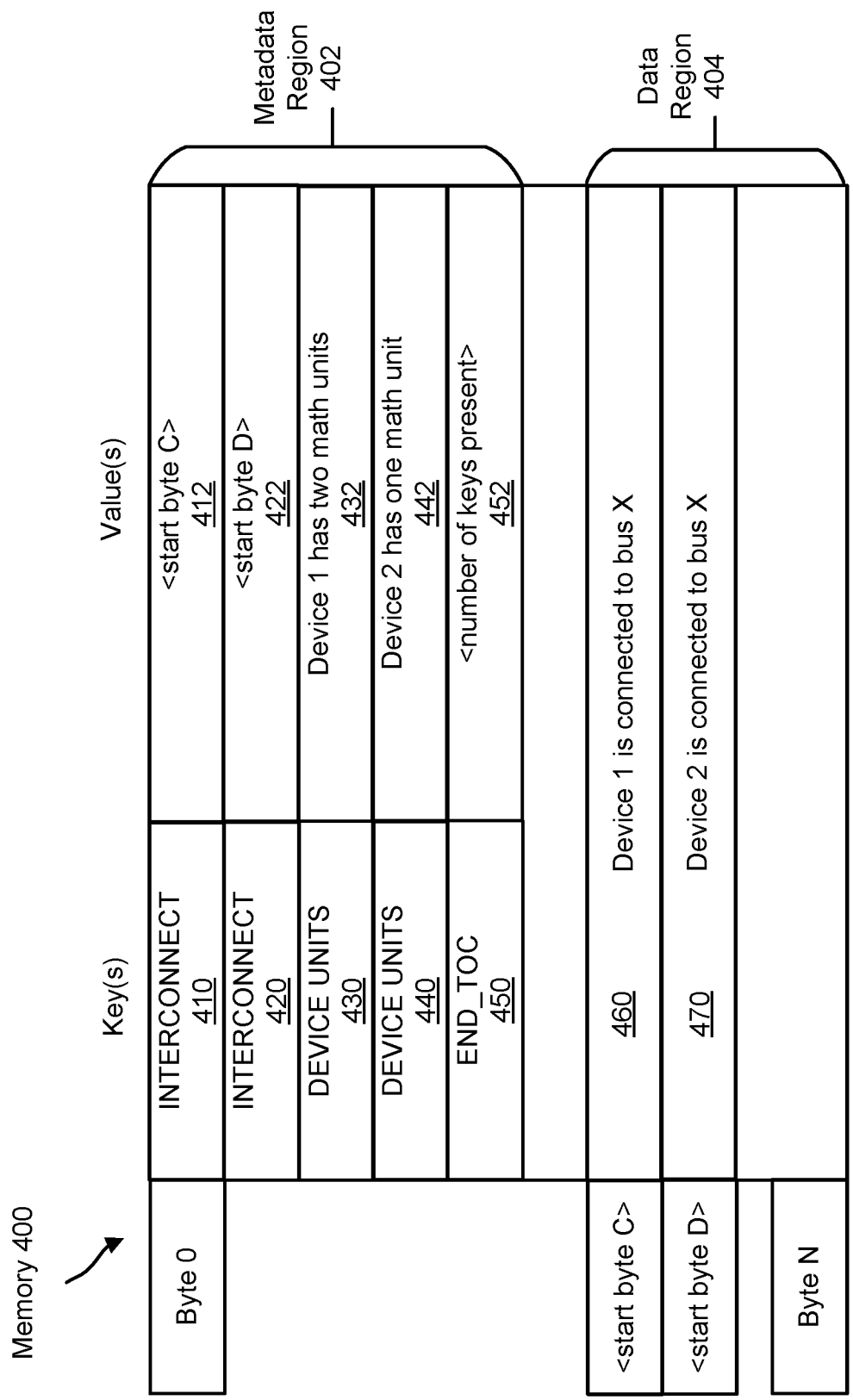

Various types of data can be represented through metadata. In the examples of FIGS. 3 and 4, keys represent configuration information and indicate specific types of device configurations. In the examples of FIGS. 5-8, keys represent data to be written to or read from a data region as part of streaming communication between a first application and a second application. The metadata does not need to specify the exact meaning of the data, as the meaning may sometimes be apparent from the context of the communication between the applications. In some instances, the data may be formatted in a way that enables an application to understand the contents of the data. For example, in a streaming communication scenario, the data could be formatted as packets in accordance with a layered communication protocol.

In a key-value pair, the value can indicate the location of data in the data region 114. Data locations can be specified in various ways, including as direct memory addresses or as offsets. If the metadata region 112 and the data region 114 are in contiguous memory space, the location where data is to be written to or read from can be specified through a value corresponding to an offset relative to the last memory address of the metadata region 112. Alternatively, the data can be contained in the metadata itself, as described in connection with FIG. 4. Keys and values can also be used to indicate other information relevant to the processing of the data. For instance, the metadata region 112 can include a special key that indicates the end of the metadata region 112. The corresponding value for this special key can indicate the total number of keys in the metadata region 112. Thus, the key-value pairs can form a table of contents (TOC) that indicates how many data items are in the data region 114, where those data items are located, and what is the significance of the data items.

In some implementations, the metadata can only be set by one of the applications (e.g., the first application), which has write access to the metadata region while the other application (e.g., the second application) does not. Through setting the metadata, an application can control the data operations that occur in the data region. For instance, the first application can set the metadata to indicate that a certain block of addresses in the data region 114 has been made available for data to be sent from the first application to the second application. The first application can also set the metadata to indicate that a certain block of addresses has been made available for data to be sent from the second application to the first application. The metadata can therefore be used to configure the memory 110 with respect to the types of data operations that occur in the data region 114 and the memory addresses where the data operations occur. In some instances, the entire data region 114 can be made available for a single data operation (e.g., a read or write). In other instances, a data operation may be performed on a subset of the data region 114.

The signal registers 120 and 130 can be implemented as hardware registers, with each of the signal registers 120, 130 being assigned to a different application. In some implementations, the signal registers 120, 130 may be permanently assigned to their respective applications. In other implementations, the signal registers 120, 130 may be selected from a pool of available registers and assigned to the first and second applications as needed. For instance, each time an application is executed, an available register can be assigned to that application. The pool of registers can include registers that are usable for other purposes besides communicating data between applications. The signal registers 120, 130 can be registers associated with the same or different processing units depending on where the applications are being executed. For example, both signal registers 120, 130 can be registers associated with the same processor (e.g., a central processing unit (CPU) of a computer system) if the applications are both executed on the processor. As another example, signal register 120 can be associated with the CPU of the computer system while signal register 130 can be associated with a processor of a hardware accelerator if one of the applications is executing on the CPU of the computer system and the other application is executing on the hardware accelerator.

The signal registers 120, 130 can be any addressable storage location outside of the memory 110. In general, the signal registers 120, 130 are much smaller than the memory 110. For example, the signal registers 120, 130 can be 32 or 64-bit registers while the memory 110 is one megabyte or greater. The signal register 120 can include one or more data flags 122. Similarly, the signal register 130 can include one or more data flags 132. The signal registers 120, 130 may only be accessible to their assigned applications. When an application sets the data flag in its assigned signal register, the data flag triggers an interrupt that is detected by the processor of the other application. For example, setting the data flag 122 in the signal register 120 may generate an interrupt signal that is received by the processor that executes the application associated with signal register 130. The interrupt can operate as a "doorbell" that signals to the processor of the other application that processing needs to occur with respect to data in the data region 114. Once received, the interrupt can be processed by an interrupt handler, which can be implemented as an application module that includes one or more subroutines for reading from and writing to the data region of a shared memory such as the memory 110. Each application can include its own interrupt handler.

In some embodiments, the signal registers 120, 130 can be implemented in memory, for example, as virtual registers. Thus, the various data and instruction flags depicted in FIG. 1 can be stored in any memory location accessed by a first application and second application in the manner described herein. For instance, the first application could be assigned a first memory location that implements signal register 120 and the second application could be assigned a second memory location that implements signal register 130, with the first memory location and the second memory location being part of the memory 110 or located on one or more additional memories.

In response to the interrupt, the interrupt handler may examine the metadata region 112 to determine what data operation needs to occur. The interrupt handler may parse the metadata region 112 to sequentially read the metadata until the end of the metadata is reached. As mentioned earlier, the end of the metadata can be indicated using a special key (e.g., "END_TOC" in FIG. 3). Upon reaching the end of the metadata, the interrupt handler may determine, based on the metadata, whether the application is supposed to read from or write to a certain location in the data region 114. If the application is to perform a read, the interrupt handler can extract the data from a location specified by the metadata to provide the data as input to the application for further processing. If the application is to perform a write, the interrupt handler can request the data from the application and store the data into the specified location.

After completing the data operation, the application can signal completion by setting the data flag in its own signal register. For example, after reading the data, the application associated with the signal register 130 can set the data flag 132 to trigger a second interrupt that is received by the interrupt handler of the application associated with the signal register 120. In this way, the application that caused the first interrupt can be notified that the data operation was successful. The memory 110 can then be used for further communication of data between the applications, for example, to overwrite the data region 114 with new data to be read by the application associated with the signal register 130.

The metadata does not have to be read in response to every occurrence of an interrupt. For instance, if the interrupt is for signaling completion of a data operation by the second application, the first application may already be aware of the contents of the metadata since the metadata could have been set earlier by the first application. As another example, in a streaming scenario, the same block of addresses can be reused for storing new data. If the application reading the data is aware that the data is being provided over the course of multiple accesses performed upon the data region 114, the application can assume that the next set of data will be available from the same block. Therefore, the metadata may only be read if the metadata has been updated following the most recent data operation and one of the applications needs to be informed about the updated metadata. In some implementations, one or more of the signal registers 120, 130 can include multiple data flags in order to explicitly indicate when the metadata should or should not be read. For instance, the signal register 120 could include a flag that indicates to the interrupt handler of the application associated with the signal register 130 that the most recently performed data operation can be repeated without rereading the metadata.

As depicted in FIG. 1, the signal registers 120, 130 can include instruction flags 124 and 134. Similar to the data flags 122, 132, each of the instruction flags 124, 134 can trigger a corresponding interrupt when set. The instruction flags 124, 134 can be set in order to request the other application to perform certain instructions, including simple instructions that do not require any input parameters. For example, setting an instruction flag 124A may trigger an interrupt that causes the application associated with the signal register 130 to perform a software reset. The number of flags in each signal register 120, 130 can vary depending on the signaling requirements of the applications. In some implementations, the signal registers 120, 130 do not include instruction flags. Each flag can be assigned to a specific bit within the signal register. The data flag 122 may, for example, correspond to bit 0 of the signal register 120 and the instruction flag 124A may correspond to bit 1. In general, any instruction that can be represented using the bits available to the signal registers 120, 130 can be executed through a flag-based interrupt. This would avoid directly transmitting the instruction to the other application and also avoid storing the instruction, for example, queuing the instruction in the memory 110.

The discussion of the storage system 100 above is to provide an overview of the use of memory resources in connection with communication between applications. Examples of memory configurations and techniques for communicating data between applications are described below in connection with the computer system illustrated in FIG. 2, but can be applied to other computer systems. Further, variations of the storage system 100 are possible, such as, for example, polling for the status of a data or instruction flag as an alternative to generating interrupts. Thus, in some embodiments, an application may be configured to poll the signal register assigned to another application (e.g., at a preconfigured interval) in order to determine whether a flag in the signal register has been set.

Figure 2:
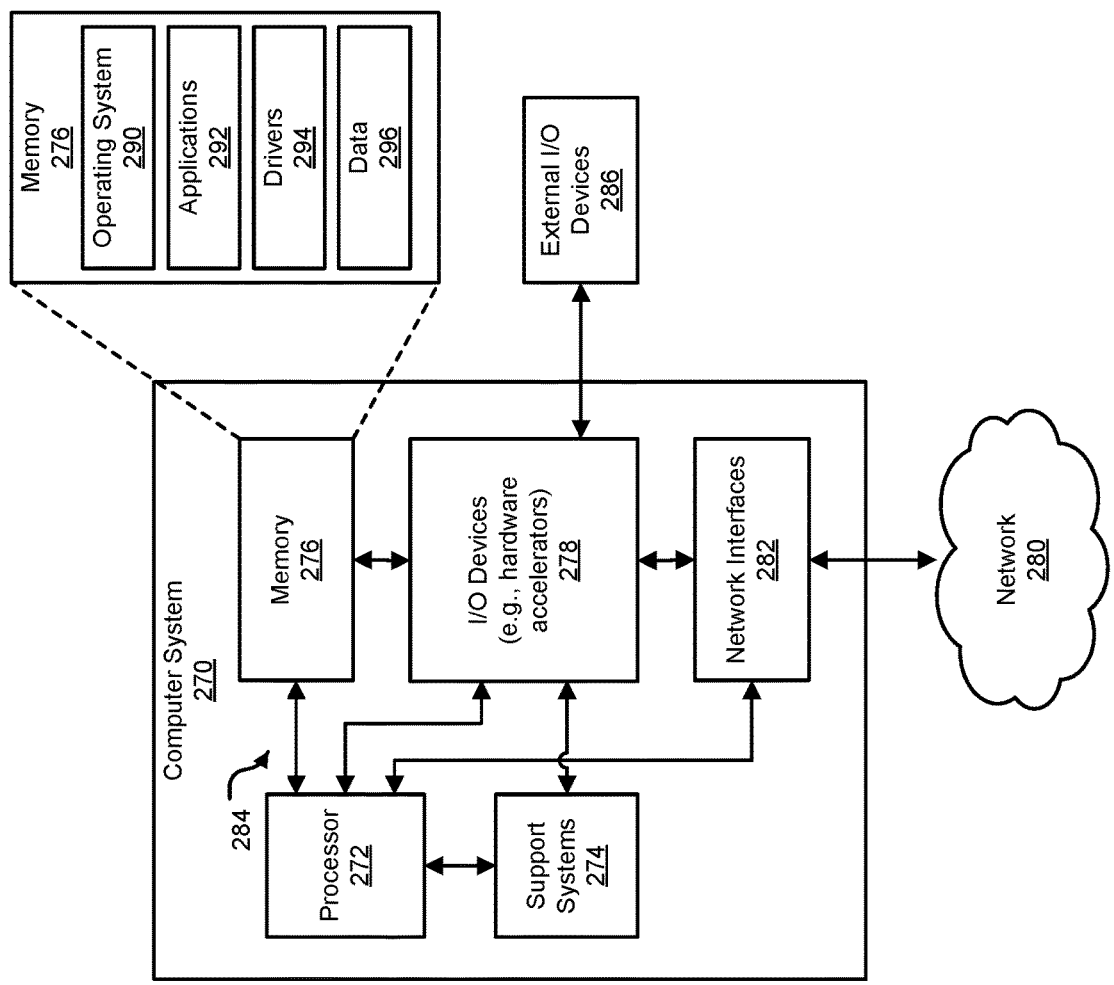
FIG. 2 illustrates an example of a computer system on which multiple applications can be executed.

FIG. 2 illustrates an example of a computer system 270 in which the storage system 100 and the applications that use the storage system 100 can be implemented. In some examples, the computer system 270 can be used to implement a general purpose computer, such as a desktop computer, a laptop computer, a server computer, a thin client, and so on. In some examples, the computer system 270 can be used to implement a mobile computing device, such as a mobile phone, a smart phone, a personal digital assistant (PDA), or a tablet computer. In some examples, the computer system 270 can be used to implement special purpose devices, such as home assistants, gaming consoles, electronic books (e-books), media centers, and so on. In some examples, the computer system 270 can be used to implement computing devices incorporated into appliances, automobiles and other vehicles, robots, and other electronic devices.

The computer system 270 includes a processor 272, processor memory 276, Input/Output (I/O) devices 278, network interfaces 282, and various support systems 274. In various implementations, the computer system 270 can include other hardware that is not illustrated in FIG. 2.

The processor 272 is a general purpose integrated circuit that is capable of executing program instructions. In some examples, the processor 272 can include multiple processing cores. In a multi-core processor, each core may be able to independently execute program code. In some examples, the cores may share resources, such as buses and caches. In some examples, the processor 272, whether single core or multi-core, may be a multi-threaded processor, in which case the processor 272 can execute multiple threads of execution (e.g., independent sets of program code) at the same time. In some examples, the computer system 270 can include more than one processor 272.

The memory 276 can include memory that is used by the processor 272 for storage of program code that the processor 272 is in the process of executing, as well as for storage of values that are being operated on by the processor 272. For example, the memory 276 can store an operating system 290, one or more applications 292, one or more device drivers 294, and data 296 associated with the operating system 290, the applications 292, and/or the drivers 294. The operating system 290, the application 292, and the device driver 294 are all examples of applications that can be executed on the computer system 270. In various examples, memory 276 can be implemented using volatile memory types (such as Random Access Memory (RAM) type memories) and/or non-volatile memory types (such as Read-Only Memory (ROM), flash memory, etc.). In some examples, some or all of the memory 276 may be accessible to the I/O devices 278. The memory 276 can be DRAM, but can also be implemented using other types of memory.

The memory 276 can be used to implement the memory 110 in FIG. 1. The signal registers 120, 130 of FIG. 1 can be implemented as registers associated with the processor 272 and/or registers associated with other processors in the computer system 270, for example, a processor of an I/O device 278. The applications assigned to the signal registers 120, 130 can be any of the applications in the memory 276. For example, in some implementations, the application assigned to the signal register 120 is the operating system 290 and the application assigned to the signal register 130 is an application 292 or a driver 294. As another example, the applications assigned to the signal registers 120, 130 can be two applications 292.

The operating system 290 can coordinate the activities of the hardware of the computer system 270, as well as the activities of the applications 292 and drivers 294. For example, the operating system 290 can perform operations such as scheduling tasks, executing applications, or controlling peripheral devices. In some examples, the operation system 290 can include a hypervisor which can support the operation of virtual machines on the computer system 270. In some examples, the hypervisor runs as a kernel space application. In these and other examples, each virtual machine can execute an independent operating system, and may have different virtual hardware configurations. Examples of operating systems include Unix, Linux, Windows, Mac OS, iOS, Android, and the like. The operating system 290 may also be a proprietary operating system.

The applications 292 can enable a user to interact with the computer system 270 and/or with systems on a network 280. The applications 292 can include user space applications, such as web browsers, text editors, video or audio players, and so on. Each of the applications 292 can be embodied as program code, or instructions that, when executed, cause the processor 272 to perform operations that implement the applications 292. In various examples, the code for the applications 292 can be stored on a non-volatile storage medium, such as a disk drive, and can be copied into the memory 276 when being executed. In some implementations, one or more applications 292 or device drivers 294 can be executed on a processor separate from the processor 272. For example, program code for an application 292 can be loaded into a memory of an I/O device 278 for execution concurrently with execution of the operating system 290 or another application 292 on processor 272.

The drivers 294 can include programs that manage communications between the operating system 290 and/or applications 292 and hardware components of the computer system 270, such as the I/O devices 278 and network interfaces 282. For example, a driver can provide an Application Programming Interface (API) that provides abstract commands for using the functions of an I/O device. The API may be standardized, and the driver may be able to translate the abstract commands to specific commands for a particular I/O device. Drivers are often kernel space applications, so that user-space code may be prevented from accidentally or intentionally misusing the hardware of the computer system 270.

The data 296 can include data used and/or operated on by the operating system 290, applications 292, and/or drivers 294. Examples of such data include web pages, video data, audio data, images, user data, and so on. Alternatively or additionally, the data 296 can include software libraries that may be used by the operating system 290, applications 292, and/or drivers 294. In some examples, the data 296 may be accessible to systems on the network 280. The data 296 can at times be communicated between applications, for example through an API or using the data communication mechanism illustrated in FIG. 1.

The I/O devices 278 can include hardware that adds functionality to the example computer system 270. For example, the I/O devices 278 can include non-volatile storage devices, such as solid state drives, magnetic drives, optical drives, and/or tape drives, among other examples. The I/O devices 278 can further include hardware accelerators such as graphics accelerators, and other, more special purpose, devices. As another example, the I/O devices 278 can include hardware for connecting to external I/O devices 286, such as keyboards, monitors, printers, and external storage drives among other devices. The network interfaces 282 are also I/O devices, although are illustrated separately here for the sake of clarity. Herein, some I/O devices may also be referred to as peripheral devices. In various examples, an I/O device can be a computing device that includes a processor and memory that are additional to the processor 272 and memory 276 of the computer system 270. The processor of the I/O device may operate independently of the processor 272, or may be used by the processor 272 for various purposes. For example, the I/O device can include a Graphics Processing Unit (GPU), which the processor 272 can use for graphics-related computations. In some examples, the computer system 270 can also be connected to external I/O devices 286, such as external hard drives.

In some examples, one or more of the I/O devices 278 can be based on one of the Peripheral Component Interconnect (PCI) standards. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices in a host system. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the computer system 270 can include a storage device that implements NVMe as the primary communication interface.

A PCI-based device can include one or more functions. A "function" describes operations that may be provided by the device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, a PCI-based device can include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to the operating system 290 and/or applications 292 to be multiple devices providing the same functionality. The functions of an SR-IOV-capable device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as, for example, a virtual machine) running on the computer system 270.

The network interfaces 282 can enable the computer system 270 to communicate with the network 580 or with multiple networks. The network interfaces 282 can include, for example, one or more network interface cards (NICs). The network interfaces 282 can include, for example, physical ports for connecting to a wired network. Alternatively or additionally, the network interfaces 282 can include antennas for connecting to a wireless network. In some examples, the network interfaces 282 can include more than one physical port, and/or more than one antenna, so that the computer system 270 can communicate with multiple networks at the same time.

The support systems 274 can include various hardware that supports the operations of the processor 272 and/or the I/O devices 278. For example, the support systems 274 can include a boot ROM that stores the code for the Basic Input/Output System (BIOS) of the computer system 270, and that enables the computer system 270 to boot from being powered on. As another example, the various support systems 274 can include a power supply and power subsystem. Other devices that may be found in the support systems 274 can include a Board Management Controller (BMC) and/or various other volatile or non-volatile memories.

The computer system 270 can further include one or more busses 284, which may also be referred to as interconnects. The busses 284 can enable the various components of the example computer system 270 to communicate with one another. For example, the busses 284 can include a bus that is dedicated to communications between the processor 272 and the processor memory 276. As another example, the busses 284 can include an I/O bus, which enables the processor 272 to communicate with the I/O devices 278, and which may enable the I/O devices 278 to communicate among each other. In some examples, the I/O bus is a PCI-based bus or bus network. The busses 284 can include other busses, such as a power management bus, sideband busses, control busses, and/or dedicated busses between certain components (e.g., a BMC and the processor 272).

The memory 276, storage devices, and other memories discussed above are each examples of computer-readable media. Other examples of computer-readable media include removable storage devices, such as magnetic tapes, floppy disks, Compact Discs (CDs), Digital Versatile Discs (DVDs), Blue-Ray disks, and flash memory drives, among other examples. In each of these examples the computereadable medium is capable of storing program code that can be executed by the processor 272 or other processor of the computer system 270. In some cases, the computer-readable medium may be non-transitory, meaning that the data stored on the computer-readable medium remains stored on the medium when power is not applied to the computer readable medium. In contrast, when power is removed from the transitory computer-readable medium, such as RAM, the data is deleted from the medium. Examples of non-transitory computer-readable media include ROM-based memory, hard disks, removable disks such as those listed above, and flash-based memory, among other examples.

Example memory configurations will now be described in connection with FIGS. 3-8. The memory configurations in FIGS. 3-8 correspond to configurations of the memory 110 in FIG. 1 and can be implemented using the memory 276 in FIG. 2. For example, in each of FIGS. 3-8, the memory configuration may comprise a block of memory addresses in a portion of memory 276 that is allocated for storing data to be communicated between applications. In some implementations, the allocation of this portion of memory can be performed by one of the applications that is a party to the communication. For example, operating system 290 may set aside a block of addresses for use in communicating error data or other information between the operating system 290 and an application 292 or driver 294.

In the examples of FIGS. 3-8, the metadata includes keys that have been agreed upon in advance between a first application and a second application. The metadata further includes values associated with the keys. The keys can indicate how the values are to be processed by the applications. In particular, the keys can indicate whether the values contain data being communicated between the applications or whether the values contain pointers to the data. Further, the keys can indicate how the data is to be interpreted. The values are specified by the first and/or second application and are set according to the contents of the data being communicated. In some embodiments, only one of the applications can write the metadata. In other embodiments, both applications can write the metadata. For example, each application may be free to specify the contents of the metadata so long as there is no pending data access initiated by the other application. This would avoiding potential conflicting use of the memory by both applications. The keys can be preconfigured through programming of the applications, e.g., built into the program code. In some embodiments, the applications may receive a list of valid keys along with definitions for those keys from an external computer system, e.g., receiving a configuration file during runtime, but prior to initiating communication with another application. In yet another embodiment, the applications may engage in a negotiation process in which the applications collectively decide on a set of keys that can be used and what those keys represent.

FIG. 3 illustrates an example of a memory 300 configured for communicating device configuration information between a first application and a second application. The memory 300 includes a metadata region 302 and a data region 304. As illustrated, the metadata region 302 does not have to be contiguous with the data region 304, but can instead be separated from the data region 304 by an unused region 306. The addresses available for use as the data region 304 can be dynamically adjusted, for example, to include a lesser amount of space than depicted in FIG. 3 or to include the unused region 306 if additional storage space is desired.

The memory 300 can be an N-byte memory in which the first set of bytes corresponds to the metadata region 302, which can start at byte 0. The metadata region 302 operates as a table of contents (TOC) for the data region 304. As illustrated in FIG. 3, the metadata region 302 can be organized as key-value pairs, with a first key 310 having an associated value 312, a second key 320 having an associated value 322, and a third key 330 having an associated value 332. Although illustrated as being contained within the same byte of memory, the keys and values can be stored in different locations. For example, each key can be followed by another byte containing the value corresponding to the key.

In the example of FIG. 3, the keys 310, 320 indicate that the corresponding data in the data region 304 contains information on the configuration of an interconnect between a first device "Device 1" and a second device "Device 2". In general, keys can indicate how to interpret data being communicated. The applications can be configured with information on the meaning of the keys, so the keys do not have to explicitly state how the data is to be interpreted. In some embodiments, the keys can indicate whether the data can be found in the metadata (e.g., the associated values) or in some other portion of the memory (e.g., data region 304). In the example of FIG. 3, the values operate as pointers that indicate where the configuration information is located within the data region 304. Value 312 indicates that data 340 represented by key 310 can be found beginning at byte C. Similarly, value 322 indicates that data 350 represented by key 320 can be found beginning at byte D.

The key 330 indicates the end of the metadata region 302. The corresponding value 332 indicates the total number of keys contained in the metadata region 302 (e.g., not including the key 330 itself). In the example of FIG. 3, the value 322 can be set to "2" to correspond to the inclusion of the keys 310 and 320. To access the data in the data region 304, an application can parse the metadata region 302 beginning with byte 0 and ending with the byte of the key 330 to identify the memory locations where the data is stored or to be stored.

The data region 304 contains the data to be transmitted between the first and second applications. As illustrated, the data region 304 spans bytes C through N, with byte C containing data 340 indicating that Device 1 is connected to bus X and byte D containing data 350 indicating that Device 2 is connected to bus X Thus, the data in bytes C and D together indicate that Device 1 and Device 2 can communicate with each other via bus X In this way, an application that wants Device 1 to communicate with Device 2 can be informed about the availability of the bus X for such communication. In the example of FIG. 3, the keys 310, 320 indicate that the corresponding data contains interconnect information, with the details of the interconnect configuration being supplied by the data 340, 350. The first and second applications may be configured to recognize, based on the keys 310, 320 being of the type "INTERCONNECT", that the corresponding values 312, 322 point to locations in the memory 300 that contain interconnect information. In some embodiments, keys may identify which interconnect the corresponding data is associated with. For example, the keys 310, 320 could explicitly identify bus X or include information enabling bus X to be distinguished from other interconnects for which configuration information is included in the memory 300.

In some implementations, the metadata region 302 is a secure region of the memory 300 and the metadata (e.g., the keys and values) can only be set by one of the applications that access the memory 300. For example, the first application may be a trusted application that has both read and write access to the metadata region 302, while the second application may be an untrusted application that has read-only access to the metadata region 302. Providing read-only access by the second application to the metadata region 302 would enable the first application to control how the data region 304 is utilized, including control over which addresses are used for data and what data is stored in those addresses.

In the example of FIG. 3, if the first application wants to inform the second application about the configuration information, the first application can, after writing the metadata to the metadata region 302 and writing the configuration information to the data region 304 as shown in the figure, signal that the memory 300 is ready to be accessed by the second application. As explained earlier in connection with FIG. 1, this signaling can be performed by setting a flag in the signal register assigned to the application that wants the other application to access the shared memory. Thus, the first application could set a flag in its signal register to trigger an interrupt for the second application, causing the second application to read the data in bytes C and D based on the metadata in the metadata region 302.

The unused region 306 can be a region reserved for storage of additional metadata or reserved as an expansion area for the data region 304. In the example of FIG. 3, the data region 304 is not completely filled, so there is no need for allocating additional space for data. However, if an amount of data greater than that which can be stored in bytes C through N is needed to be stored, then the unused region 306 could be allocated to the data region 304 to increase the storage capacity. Similarly, if additional metadata entries were needed, the additional metadata could be written into the unused region 306. In some implementations, the unused region can be switched between storing metadata and storing data. The unused region 306 could also be a region reserved for other purposes, for example, to store data that is used by the application which sets the metadata, but is not shared with the other application.

FIG. 4 illustrates an example of a memory 400 configured for communicating device configuration information between a first application and a second application. The memory 400 can be configured in a manner similar to that described in connection with the memory 300 of FIG. 3 and includes a metadata region 402 and a data region 404. Similar to the metadata region 302, the metadata region 402 includes keys 410, 420, 430, 440, and 450, which are associated with respective values 412, 422, 432, 442, and 452. The keys 410, 420 are analogous to the keys 310, 320 and indicate that data 460 and 470 in the data region 404 contain configuration information for an interconnect (in this example, the same bus X from FIG. 3) between two I/O devices.

The keys 430, 440 and their corresponding values 432, 442 indicate that the I/O devices include certain processing units. Specifically, the value 432 indicates that Device 1 has two math units (processing units that perform arithmetic operations) and the value 442 indicates that Device 2 has one math unit. The first and second applications may be configured to recognize that the value associated with a key of the type "DEVICE UNITS" contains information on the capabilities of a device. Thus, FIG. 4 illustrates another way to communicate data between applications. Specifically, the example of FIG. 4 includes configuration information in the metadata itself, i.e., the values 432, 442. The metadata region 402 can therefore be used as an alternative data storage area, which may be useful for avoiding having to reference the data region 404 every time data is being communicated. Accordingly, the values contained in the metadata can be pointers to a memory location that contains data (e.g., pointers to an address in the data region 404, as described in the example of FIG. 3), or the values can include the data itself. The contents of the values 432, 442 can be specified prior to signaling that the memory 400 is ready to be accessed (e.g., to send the information on the capabilities of Device 1 and Device 2 from the first application to the second application). Alternatively, the values 432, 442 can be specified after signaling that the memory 400 is ready to be accessed. For example, the first application could write the keys 430, 440, then signal the second application to cause the second application to write the device capability information to the values 432, 442 for reading by the first application. The key 450 is associated with a value 452 and indicates the end of the metadata region 402. In this example, the value 452 can be set to "4" since there are four keys besides the key 450.

The examples of FIGS. 3 and 4 illustrate how a shared memory can be used to communicate device configuration information between two applications. However, any type of data can be communicated using a memory configured in accordance with the examples described herein. As mentioned earlier, error information is another example. An application may occasionally experience an error such as a software exception during runtime of the application or a hardware error generated by a device with which the application communicates. When an error occurs, it is sometimes desirable to share information about the error with another application, for example, when the other application has a software routine for handling the error or so that the other application can adjust its own operation accordingly. Shared memories can also be used in connection with streaming communication between two applications, as illustrated in FIGS. 5-8. In a streaming communication scenario, a data stream can be communicated by writing to an allocated data region and rewriting to the data region if additional data needs to be sent to the receiving application.

Figure 5:
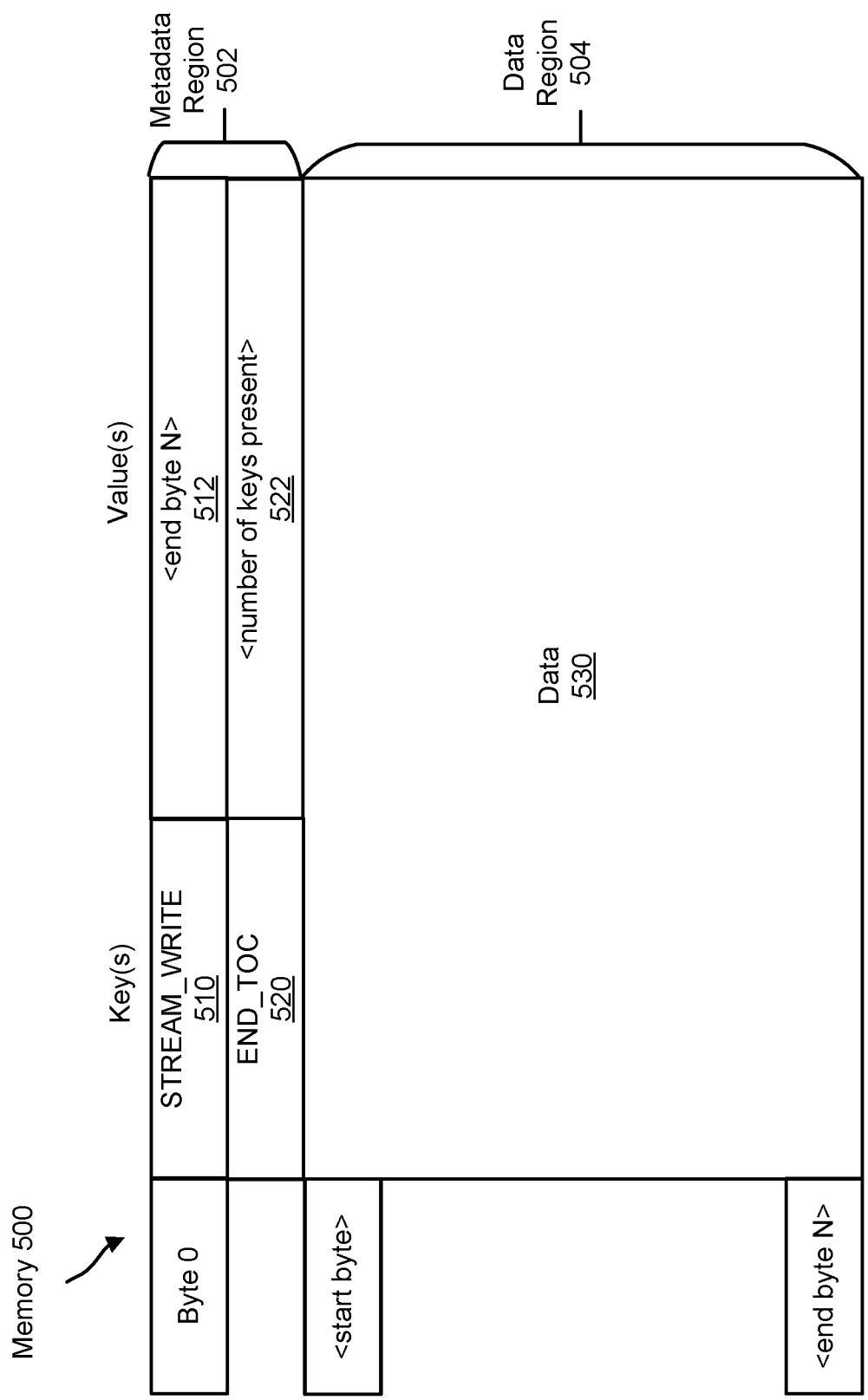
FIG. 5 illustrates a memory configured for streamed writing of data during half-duplex communication between applications.

FIG. 5 illustrates a memory 500 configured for streamed writing of data during half-duplex communication between a first application and a second application. In a half-duplex configuration, transmission can occur in both directions, but only in one direction at any given time. In the example of FIG. 5, the first application wants to send a data stream to the second application. To send the data stream, the first application writes metadata to a metadata region 502 and also writes corresponding data 530 to a data region 504. The data 530 can be unformatted data or data formatted in a manner expected by the second application. For instance, the data 530 can be packets formatted in accordance with a communication protocol that the first application uses to communicate with the second application. The communication protocol can be a layered communication protocol according to the Open Systems Interconnection (OSI) model, where the memory 500 represents the physical layer and the data 530 represents the data link layer and possibly higher level layers such as the network layer.

The metadata region 502 includes a key 510 indicating that the data region 504 is being used by the first application for streaming data to the second application. The key 510 has an associated value 512 indicating that the data being streamed ends at byte N (e.g., the last byte of the memory 500). As with the examples in FIGS. 3 and 4, the metadata region 502 can include a key-value pair (comprising a key 520 and a value 522) that indicates the end of the metadata region and the number of keys present in the metadata. In this example, the value 522 can be set "1".

The metadata and the data 530 can be written to the memory 500 at different times. In some implementations, the metadata is written before writing the data 530. However, the metadata and the data 530 can be written in any order so long as this information is available in the memory 500 before setting a flag in the signal register assigned to the first application (e.g., the data flag 122 in FIG. 1). After writing the metadata and the data 530, the first application can set the flag in its signal register to indicate to the second application that the memory 500 is ready to be accessed. The setting of the flag can trigger an interrupt that causes the second application to read the metadata in the metadata region 502 and determine, based on the key 510 and the value 512, that the first application is sending data which ends at byte N. In this example, the metadata only specifies the end of the data 530 and not the beginning, so the second application can assume that the data 530 begins immediately after the metadata region 502. However, in some examples, the metadata may specify the start of the data in addition or as an alternative to specifying the end of the data.

To signal to the first application that the second application has finished reading the data 530, the second application can send a direct communication (e.g., over an API) to the first application. In some implementations, the second application may signal that it has finished reading the data by setting a flag in its own signal register (e.g., the data flag 132 or a separate flag used specifically for indicating that data has been read). In response to receiving the signal from the second application, the first application may reset its own flag (e.g., the data flag 122). If the first application needs to send additional data as part of the streamed communication, the first application can repeat the process by overwriting the metadata and the data 530 and once again setting the flag in its own signal register.

Figure 6:
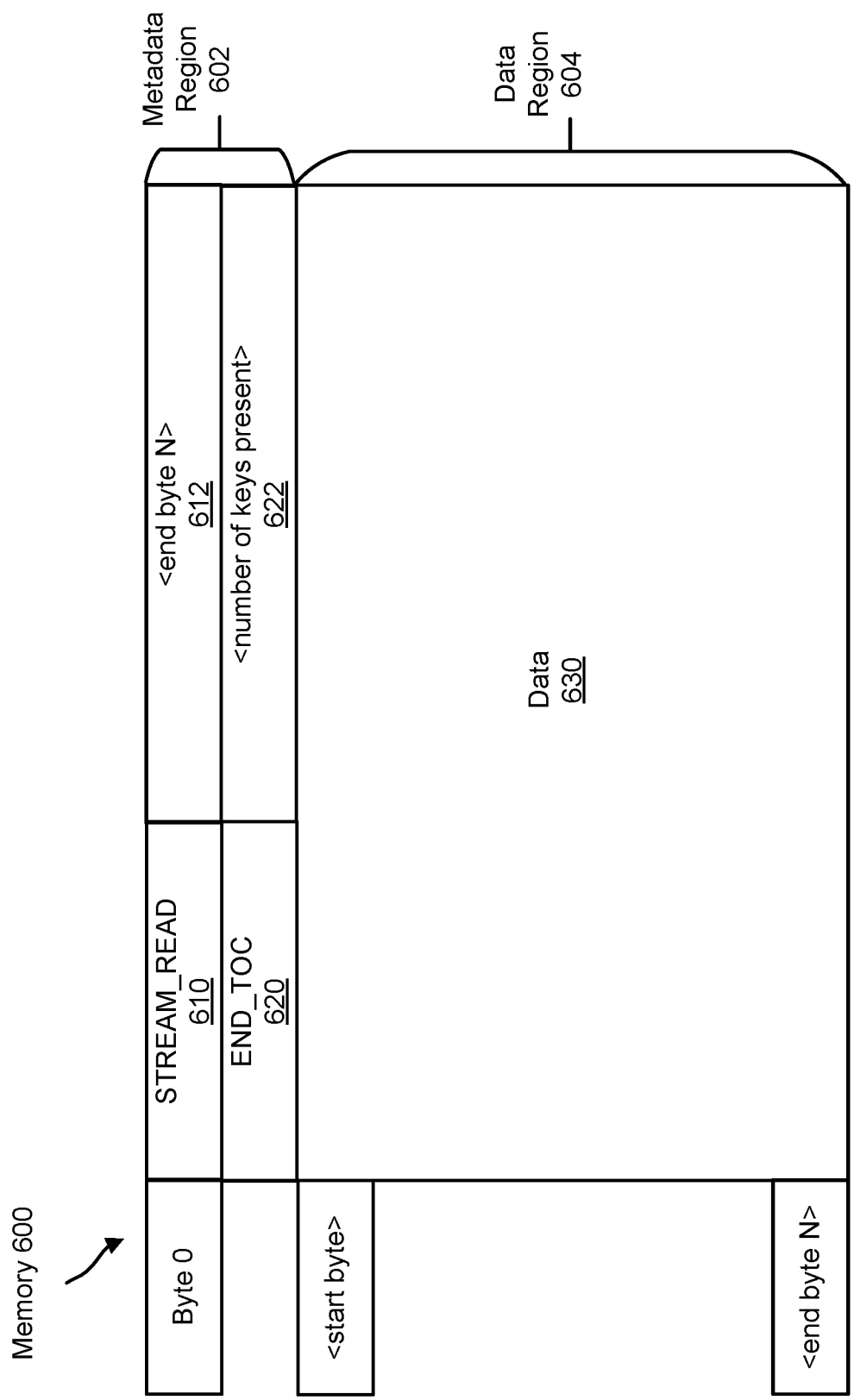
FIG. 6 illustrates a memory configured for streamed reading of data during half-duplex communication between applications.

FIG. 6 illustrates a memory 600 configured for streamed reading of data during half-duplex communication between a first application and a second application. In the example of FIG. 5, the memory 500 is used by the first application to send a data stream to the second application. In FIG. 6, the memory 600 is used by the first application to receive a data stream from the second application. For instance, to avoid receiving a direct transmission of data from the second application, the first application can use the memory 600 to receive such data. The memory 600 includes a metadata region 602 and a data region 604. The metadata region 602 includes a key 610 indicating that the first application expects to receive a data stream and a value 612 indicating that the data 630 to be received should be placed into the memory 600, beginning immediately after the metadata region 602 (since no start byte has been specified in this example) and ending at byte N. The metadata region 602 further includes a key 620 indicating the end of the metadata region 602 and a value 622 indicating the number of keys present. In the example of FIG. 6, the value 622 can be set to "1".

After writing the metadata as shown in FIG. 6, the first application can set a flag in its signal register (e.g., the data flag 122) to signal that the first application is ready to receive the data. This triggers an interrupt that causes the second application to read the metadata in the metadata region 602 and, based on the key 610 and the value 612, write the data 630 to the data region 604 beginning from the end of the metadata region 602 and ending at byte N. At the time of the interrupt, the data region 604 may be empty or contain data from a previous communication. If the data region 604 is not empty, it may be overwritten with the data 630. After writing the data 630, the second application can set a flag in its signal register (e.g., the data flag 132) to indicate that the data 630 is ready to be read by the first application.

Figure 7:
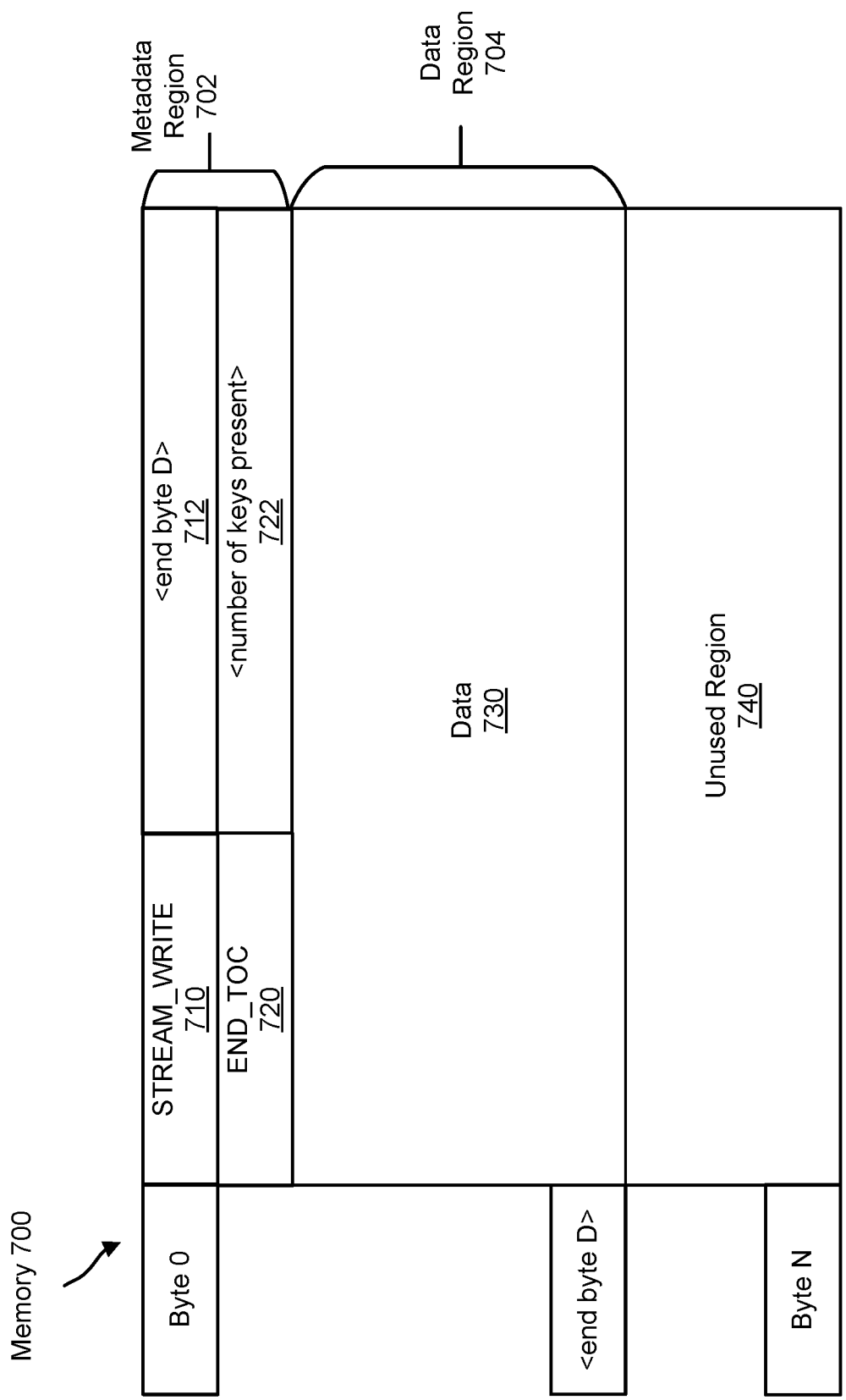
FIG. 7 illustrates a memory configured for streamed writing of a different amount of data than in the example of FIG. 5.

FIG. 7 illustrates an example of a memory 700 configured for streamed writing of a different amount of data 730 than in the embodiment of FIG. 5. Like the example of FIG. 5, the memory 700 is configured for half-duplex communication and includes a metadata region 702 containing a key 710 indicating that a data region 704 is being used by the first application for streaming data 730 to the second application. The metadata region 702 further includes a key 720 indicating the end of the metadata region 702 and a value 722 indicating the number of keys present (e.g., "1").

In FIG. 5, the key 510 has an associated value 512 which indicates that the data 530 ends at byte N, which is the last byte of the memory. In contrast, the key 710 in FIG. 7 has an associated value 712 indicating that the data 730 ends at byte D, before byte N. In the example of FIG. 7, byte D corresponds to the end of the data region 704, with a remainder of the memory 700 being an unused region 740. Thus, FIG. 7 illustrates that the size and location of the data region can be modified. In particular, the application that sets the metadata can specify how much data the application expects to read or write and where the data is located, without being constrained to a fixed set of memory locations.

After writing the metadata and the data 730 as shown in FIG. 7, the first application can set a flag in its signal register (e.g., the data flag 122) to trigger an interrupt that causes the second application to read the metadata and, based on the metadata, read the data 730. In particular, the value 712 indicates that the second application should stop reading after byte D. Further, since a starting location has not been specified in this example, the second application can assume that the data 730 begins at the end of the metadata region 702, i.e., after the byte corresponding to the key 720. As with the example of FIG. 5, the second application can signal that it has finished reading the data either directly or by setting a flag in its own signal register.

As mentioned earlier in connection with FIG. 1, the metadata does not have to be read in response to every occurrence of an interrupt. In the example of FIG. 5, if the data stream is too large to fit into the memory 500 at once, the first application may write the first portion (e.g., as the data 530), trigger a first interrupt for the second application, wait for the second application to finish reading the first portion, write the second portion (e.g., by overwriting the data 530), and trigger a second interrupt that causes the second application to read the second portion. In this example, the second application can read the metadata 510, 512, 520, and 522 in response to the first interrupt, determine that additional data is being sent (e.g., because the second application is expecting a certain amount of data), and read the second portion in response to the second interrupt without rereading the metadata. In some implementations, the metadata may include information indicating that the data is not being provided all at once. For example, the metadata could include a value indicating the size of the data stream. Alternatively, the metadata could include a value indicating the number of times the data wraps around the data region.

Figure 8:
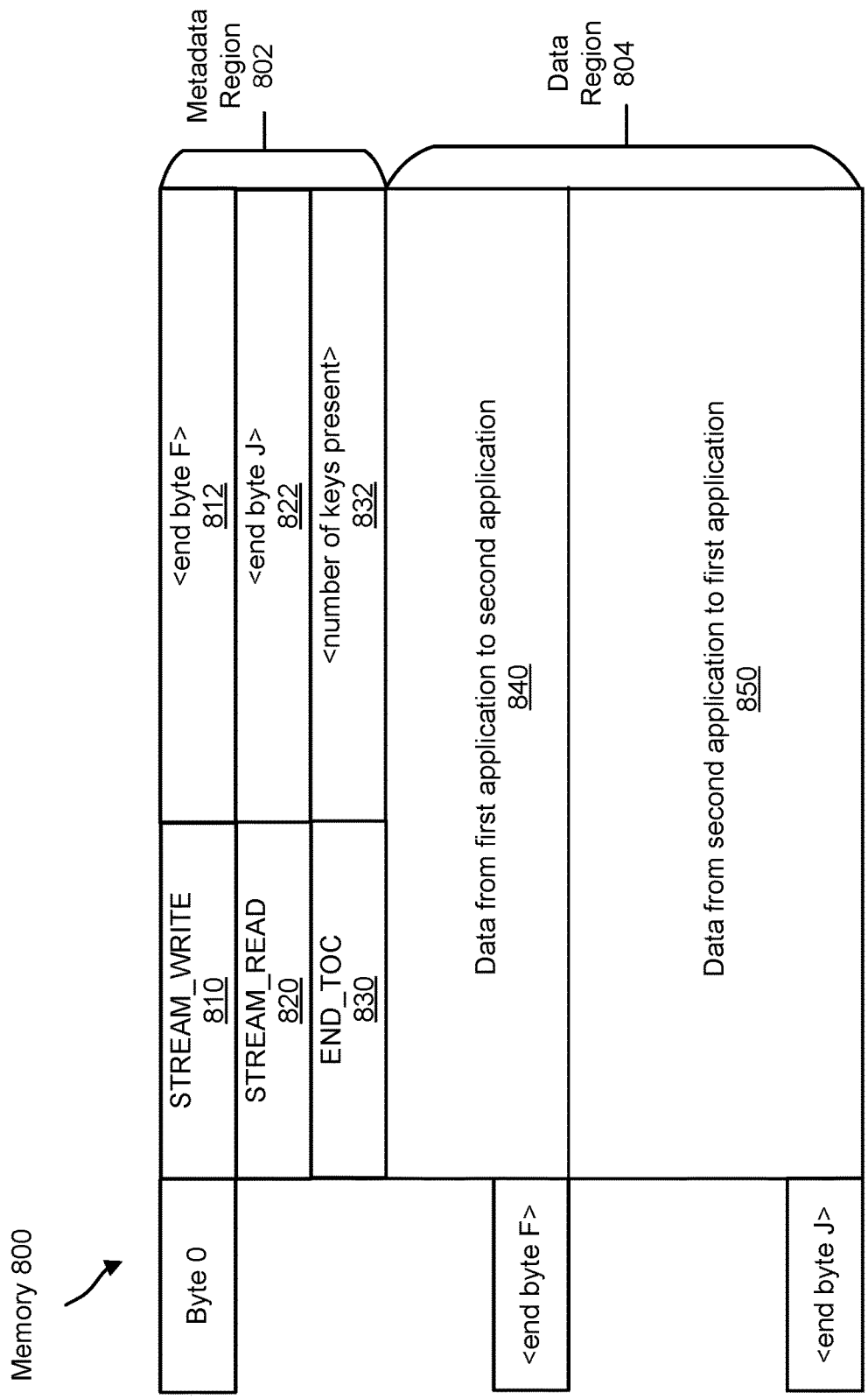
FIG. 8 illustrates a memory configured for full-duplex communication between applications.

In the half-duplex examples of FIGS. 5 and 6, the data region is used to transmit in one direction at any given time. As shown in FIG. 8, a memory 800 can be split into sub-regions to enable simultaneous two-way transmission, i.e., full-duplex communication. In comparison to half-duplex communication, full-duplex communication can permit applications to communicate with a lower latency. However, because each application is allocated a sub-region rather than the entire data region, the bandwidth for each side is lower.

FIG. 8 illustrates a memory 800 configured for full-duplex communication between a first application and a second application. The memory 800 includes a metadata region 802 and a data region 804. As with the earlier examples in FIGS. 3-7, the metadata region 802 can be writable by only one application or writable by both applications. For instance, in some implementations the first application can specify the contents of the metadata region 802 in order to control which portions of the data region 804 are used during the full-duplex communication. In this manner, the first application may allocate a certain bandwidth for the second application. The bandwidth can be adjusted up or down over time, similar to how quality of service (QoS) is provisioned in a data communication network. For simplicity, the discussion of FIG. 8 herein assumes that the metadata region 802 is written to by only one application, in particular, the first application.

The metadata region 802 includes a key 810 associated with a value 812. The key 810 indicates that the first application is sending data 840 to the second application by writing to the memory 800. The value 812 indicates that the data 840 being sent to the second application ends at byte F. The metadata region 802 further includes a key 820 and a corresponding value 822. The key 820 indicates that the first application expects to receive data 850 from the second application. The value 822 indicates that the data 850 to be received by the first application should end at byte J. A key 830 and an associated value 832 indicate the end of the metadata region 802. In this example, the value 832 can be set to "2".

The first application can, after writing the metadata in the metadata region 802 and writing the data 840, set the flag in the signal register assigned to the first application. This causes the second application to read the metadata from the metadata region 802 to determine, based on the key-value pair 810, 812, that there is data being sent from the first application, ending at byte F. The second application further determines, based on the key-value pair 820, 822, that there is data to be sent to the first application, ending at byte J. Based on the metadata in the metadata region 802, the second application can simultaneously read the data 840 and write the data 850. Although the example of FIG. 8 features a memory configured for duplex communication, the memory 800 can be configured for any number of independent data accesses in any direction. For example, both of the data regions 840, 850 could be used for streaming data from the first application to the second application or vice versa.

In the example of FIG. 8, the order of the keys assists the second application in identifying the boundaries of the read and write locations. Since the key 810 is the first key in the metadata region 802, the second application may assume that the data 840 begins immediately after the metadata region 802. Further, since the key 820 is the next key after key 810, the second application may assume that the data 850 begins immediately after the end of the data 840, i.e., after byte F. In an alternative implementation, the boundaries could be specified through associating a key with two metadata values. For example, instead of being associated with a single value that indicates an ending location, each key 810, 820 could be associated with two values: a first value specifying a start location and a second value specifying an end location.

A computer system implementing a data communication mechanism in accordance with the examples described above can include a hardware accelerator that is controlled by at least one application that is a party to the data communication. For instance, the computer system can include multiple accelerators that together form an acceleration engine, as shown in FIG. 9.

Figure 9:
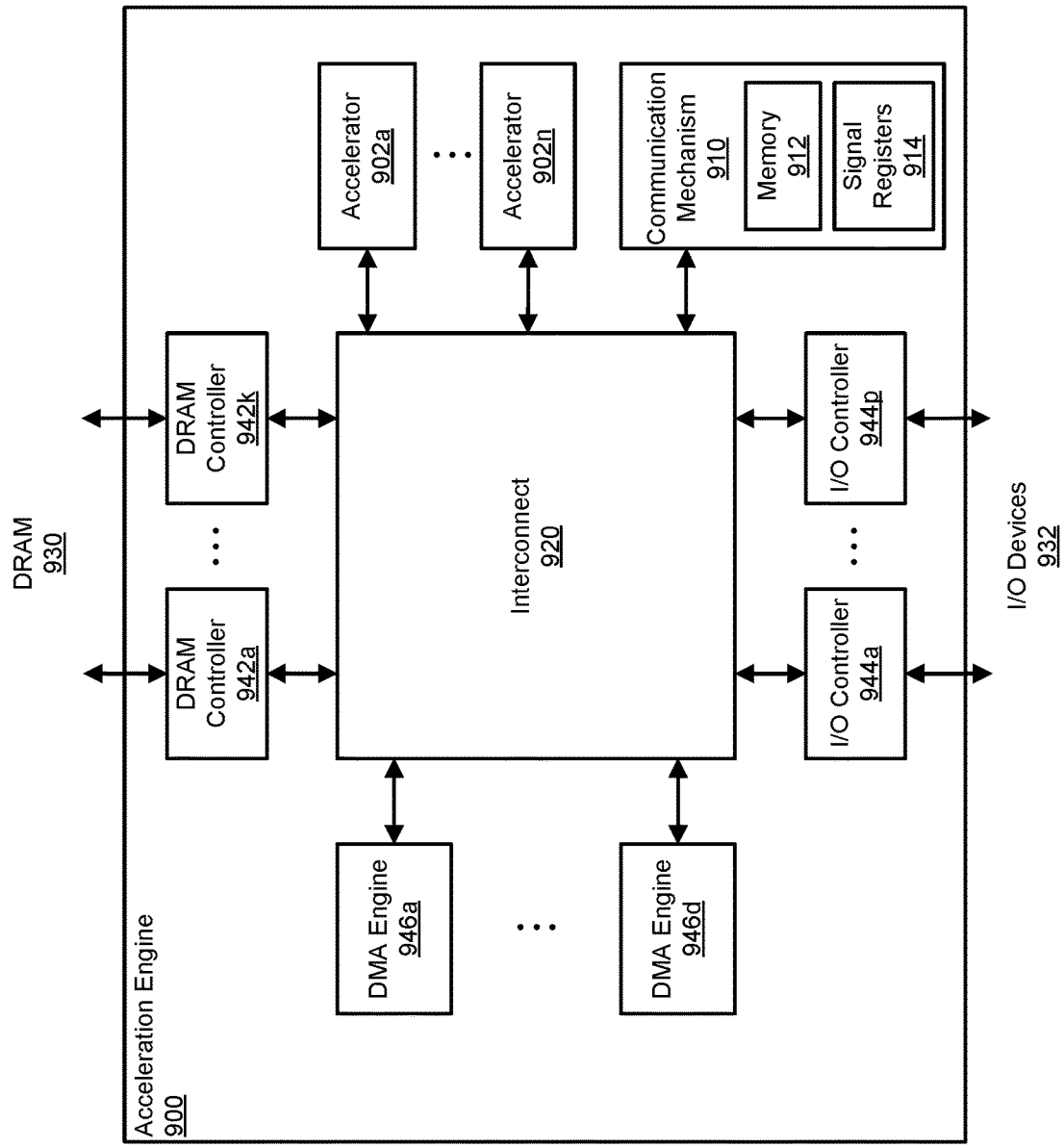
FIG. 9 illustrates an example of an acceleration engine that can be included in the computer system of FIG. 2.

FIG. 9 includes a block diagram that illustrates an example of an acceleration engine 900 that can be included in a computer system in which applications communicate with each other. For example, the acceleration engine 900 can be one of the I/O devices 278 of the computer system 270 in FIG. 2. The acceleration engine 900 can be implemented as a monolithic unit (e.g., an integrated circuit) or as a set of discrete components that are remotely located from each other and coupled via an interconnect 920.

The acceleration engine 900 includes a communication mechanism 910 comprising a memory 912 and signal registers 914. The communication mechanism 910 is communicatively coupled to the interconnect 920 and enables communication of data between applications including, for example, communication between two applications executing on the acceleration engine 900. The memory 912 and the signal registers 914 can be used to implement the memory 110 and the signal registers 120, 130 in FIG. 1. In the example of FIG. 9, the memory 912 and the signal registers 914 are located external to processing units of the acceleration engine 900 (e.g., accelerators 902). However, as discussed earlier, the memory and signal registers can be distributed in various ways.

The acceleration engine 900 further includes multiple accelerators 902a-902n, each of which can perform a set of operations. In various examples, the accelerators 902a-902n can be purpose built for particular types of operations, so that the accelerators 902a-902n can perform the operations much faster than when similar operations are performed by a general purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the accelerators is a graphics accelerator) or can be different (e.g., the accelerators 902a-902n include a graphics accelerator, a floating point accelerator, and neural network accelerator).

In some embodiments, the communication mechanism 910 may enable communication between a first application executing on a first one of the accelerators 902a-902n and a second application executing on a second one of the accelerators 902a-902n. Alternatively, the communication mechanism 910 could enable communication between a first application executing on an accelerator 902a-902n and a second application executing on a processor external to the acceleration engine 900 (e.g., the processor 272 of the computer system 270 in FIG. 2).

The example acceleration engine 900 further includes DRAM controllers 942a-942k for communicating with an external memory. The external memory can correspond to the memory 110 in FIG. 1 and is implemented, in this example, using a DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. The programs executed by the accelerators 902a-902n may include applications that communicate with each other, such as the first and second applications described earlier in connection with FIGS. 3-8.

The example acceleration engine 900 further includes I/O controllers 944a-944p for communicating with I/O devices 932 in the computer system. The acceleration engine 900 can communicate with I/O devices over, for example, a processor bus. In some examples, the processor bus can be implemented using PCI and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor (e.g., the processor 272 in FIG. 2). For example, the acceleration engine 900 can be the recipient of input data from the host processor and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

The example acceleration engine 900 further includes DMA engines 946a-946d that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueueing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In the example acceleration engine 900, the various components can communicate over the interconnect 920. The interconnect 920 primarily includes wiring for routing data between the components of the acceleration engine 900.

In some cases, the interconnect 920 can include a minimal amount of logic, such as multiplexors to control the direction of data, flip-flops for handling clock domain crossings, and timing logic. When used in accordance with the examples in FIGS. 3 and 4, the DRAM 930 can communicate information about the interconnect 920 from one application to another. For example, the interconnect 920 can correspond to bus X and Device 1 and Device 2 can correspond to accelerators 902.

Figure 10:
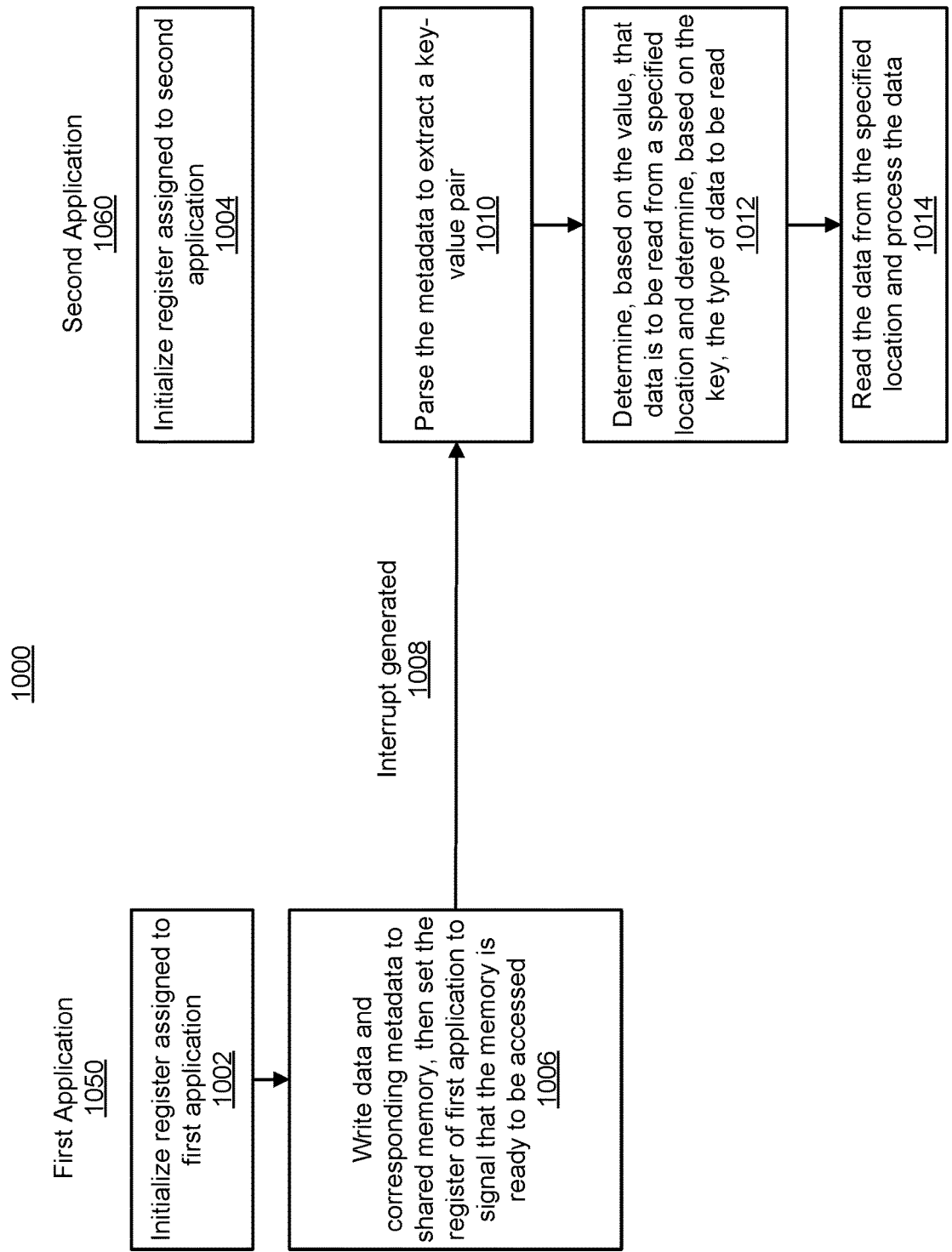
FIG. 10 is a flow diagram of an example process for writing data to a shared memory.

FIG. 10 is a flow diagram of an example process 1000 for writing data to a shared memory. The process 1000 is performed by a first application 1050 and a second application 1060, which can correspond to the first and second applications discussed earlier in connection with FIGS. 3-8. Further, some or all of the process 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium can be non-transitory.

At step 1002, the first application 1050 initializes a register assigned to it (e.g., the signal register 120 in FIG. 1). Similarly, at step 1004, the second application 1060 initializes a register assigned to it (e.g., the signal register 130). Initializing a register may involve clearing the contents of the register and/or setting one or more flags (e.g., the flags 122, 124, 132, and 134) to some default value. Steps 1002 and 1004 can be performed concurrently or at different times.

At step 1006, the first application 1050 writes data and corresponding metadata to the shared memory (e.g., the memory 110). In particular, the data can be written to a data region of the shared memory and the metadata can be written to a metadata region of the shared memory. After writing the metadata and the data, the first application 1050 sets its assigned register (e.g., setting the data flag 122) to signal to the second application 1060 that the memory is ready to be accessed.

At step 1008, an interrupt is generated in response to the setting of the register in step 1006. The interrupt can be detected by a processor on which the second application 1060 is executing.

At step 1010, the second application 1060 parses the metadata to extract a key-value pair from the metadata.

At step 1012, the second application 1060 determines, based on the extracted value, that data is to be read from a particular location in the shared memory, with the location being specified by the extracted value. The location can correspond to the beginning of the data (as illustrated in FIGS. 3 and 4) or the end of the data (as illustrated in FIGS. 5-8). Further, the second application can determine, based on the extracted key, the type of data to be read (e.g., device configuration information, error information, or a data stream).

At step 1014, the second application 1060 reads the data from the specified location and processes the data. The second application 1060 knows how to process the data because the determination in step 1012 of the type of data to be read provides the semantic meaning of the data.

Figure 11:
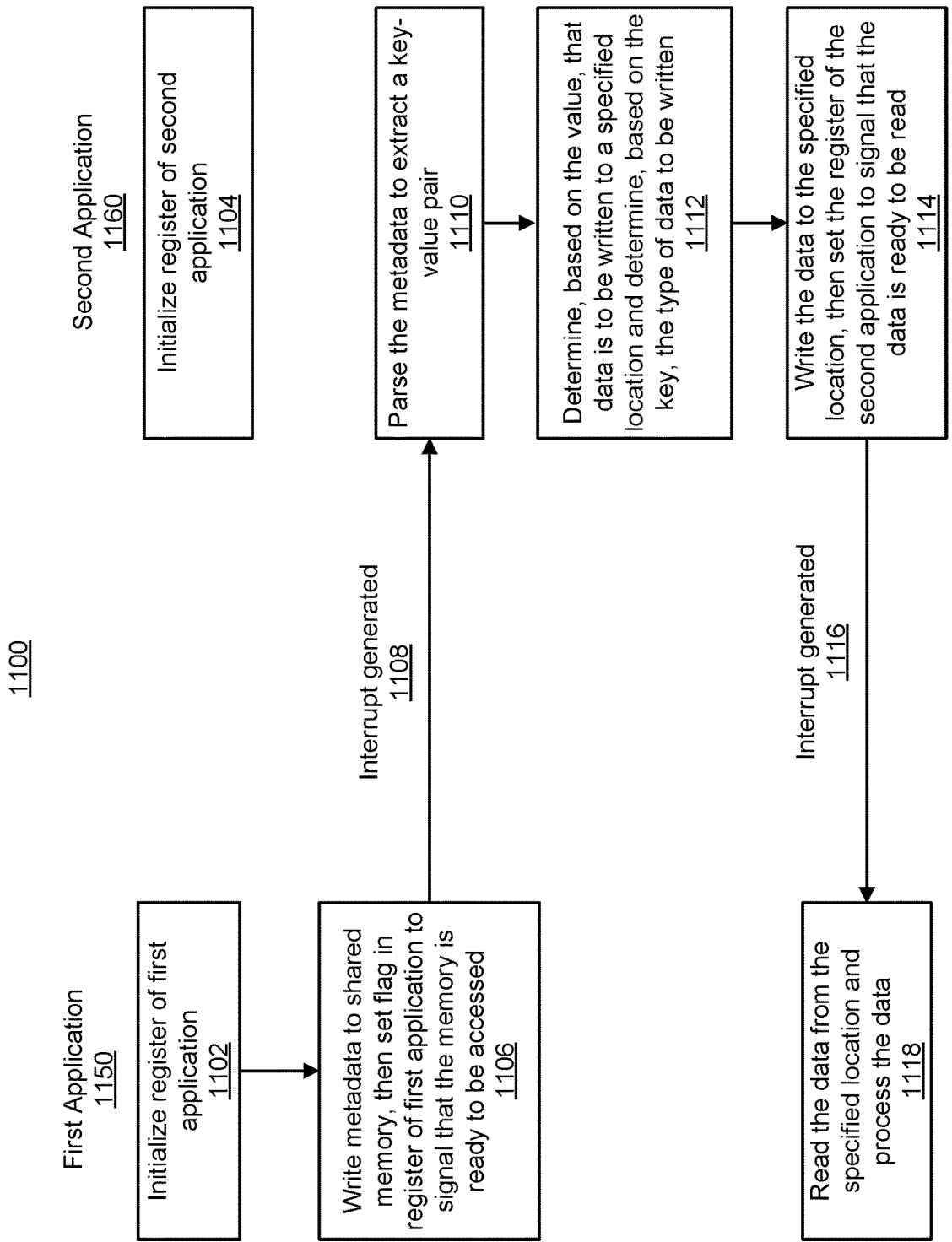
FIG. 11 is a flow diagram of an example process for reading data from a shared memory.

FIG. 11 is a flow diagram of an example process 1100 for reading data from a shared memory. The process 1100 is performed by a first application 1150 and a second application 1160, which can correspond to the first and second applications discussed earlier in connection with the examples of FIGS. 3-8.

At step 1102, the first application 1150 initializes a register assigned to it (e.g., the signal register 120 in FIG. 1). Similarly, at step 1104, the second application 1160 initializes a register assigned to it (e.g., the signal register 130). Steps 1102 and 1104 can be performed concurrently or at different times, and in the same manner described with respect to steps 1002 and 1004 in FIG. 10.

At step 1106, the first application 1150 writes metadata to the shared memory, then sets the register assigned to the first application to signal to the second application that the memory is ready to be accessed. The setting of the register in step 1106 can involve setting the same flag discussed in step 1006 of FIG. 10 (e.g., the data flag 122).

At step 1108, an interrupt is generated in response to the setting of the register in step 1106. The interrupt can be detected by a processor on which the second application 1160 is executing.

At step 1110, the second application 1160 parses the metadata to extract a key-value pair from the metadata.

At step 1112, the second application 1160 determines, based on the extracted value, that the data is to be written to a particular location in the shared memory, with the location being specified by the extracted value. The location can correspond to the beginning of the data (as illustrated in FIGS. 3 and 4) or the end of the data (as illustrated in FIGS. 5-8). Further, the second application can determine, based on the extracted key, the type of data to be written (e.g., device configuration information, error information, or a data stream).

At step 1114, the second application 1160 writes the data to the specified location, then sets the register assigned to the second application 1160 (e.g., setting the data flag 132). The second application 1160 knows what data to write because the determination in step 1112 of the type of data to be written provides the semantic meaning of the data.

At step 1116, a second interrupt is generated in response to the setting of the register in step 1114. The interrupt can be detected by a processor on which the first application 1150 is executing.

At step 1118, the first application 1150 reads the data from the specified location and processes the data. The first application 1150 does not have to read the metadata in order to read from the specified location or determine how to process the data because the first application 1150 wrote the metadata in step 1106.

FIG. 12 is a flow diagram of an example process 1200 for communicating data between applications. The process 1200 is performed by a first application executing on a computer system (e.g., the computer system 270 in FIG. 2) to communicate with a second application executing on the computer system. The first and second applications in FIG. 12 can correspond to the first and second applications discussed earlier in connection with the examples of FIGS. 3-8.

At step 1202, the first application configures a memory for communicating with the second application. The configuring of the memory includes writing metadata to a metadata region of the memory (e.g., metadata region 112 in FIG. 1). The metadata indicates how data being communicated between the first application and the second application is to be interpreted by the first application and the second application (e.g., using a key agreed upon by the first application and the second application). The metadata further indicates that the data can be found in the metadata itself (e.g., in a value, as described in connection with FIG. 4) or in a first location in a data region (e.g., data region 114) of the memory. As explained earlier, the metadata region can be a secure region of the memory that is writeable by the first application, but not the second application, so that the first application can control how the memory is used. In some instances, the data comprises configuration information for a device in the computer system, in order to inform the second application about the existence of the device configuration. In some instances, the data comprises data streamed from the first application to the second application or vice versa (e.g., as part of a half-duplex or full-duplex communication transaction). Other types of data can also be communicated by writing such data to the data region.

At step 1204, after writing the metadata, the first application sets a first flag in a memory location assigned to the first application (e.g., setting the data flag 122 in the signal register 120) to indicate to the second application that the memory is ready to be accessed by the second application. The setting of the first flag causes the second application to read the data from or write the data to the memory based on the metadata. For instance, the setting of the first flag may trigger an interrupt received by the processor on which the second application is executing, the interrupt informing the second application that there is metadata to be read. The data may be read from or written to multiple locations that are identified, at least in part, based on the metadata. In some instances, the second application may determine that the data begins after the metadata region or after another item of data in the data region, and that the data ends at the first location.

At step 1206, the first application receives an indication that the second application has finished reading or writing the data. The indication can be based on setting of a second flag in a memory location assigned to the second application (e.g., setting the data flag 132 in the signal register 130). If the second application performed a write, then the first application can read the data from the memory. If the second application performed a read, then the first application can delete or overwrite the data as it may no longer be needed. The memory can then be used for further communication between the first application and the second application. For example, the first application can update the metadata to, among other things, indicate a different location for new data, thereby reconfiguring the memory for a subsequent access by the second application, where the subsequent access is triggered by the first application setting the first flag for a second time. In this manner, the memory can, for example, be used to stream data over the course of multiple accesses to the memory, where the amount of data being streamed varies over time. One reason why the amount of data streamed or otherwise communicated might vary is because the first application may be responsible for allocating a certain bandwidth for the second application, where the amount of bandwidth depends on a priority of the data being transmitted and/or a priority of the second application.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer system, comprising:
   one or more processors configured to execute a first application and a second application;
   a memory divided into a metadata region and a data region;
   a first signal register assigned to the first application, the first signal register including a first flag settable by the first application but not the second application; and
   a second signal register assigned to the second application, the second signal register including a second flag settable by the second application but not the first application;
   wherein the metadata region includes metadata specified by the first application, the metadata comprising a key-value pair, the key-value pair including a key and a value, the key indicating that the value points to a location in the data region for data being communicated between the first application and the second application, the key further indicating how the data is to be interpreted by the first application and the second application;
   wherein the first application has read and write access to the entire metadata region, and wherein the second application has read-only access to the entire metadata region;
   wherein setting of the first flag by the first application triggers a first interrupt that causes the second application to:
      read the key-value pair from the metadata region,
      based on the key, determine whether the second application will read or write the data, and
      based on the value, access the location in the data region to perform the read or write determined based on the key; and
   wherein setting of the second flag by the second application triggers a second interrupt that indicates to the first application that the second application has finished reading the data from or writing the data to the location in the data region.

2. The computer system of claim 1, wherein the data comprises configuration information for a device in the computer system.

3. The computer system of claim 1, wherein the data comprises data streamed from the first application to the second application or from the second application to the first application, and wherein the data is formatted according to a layered communication protocol.

4. A computer system, comprising:
   one or more processors configured to execute a first application and a second application;
   a memory configurable to include a metadata region and a data region;
   a first memory location assigned to the first application, the first memory location including a first flag; and
   a second memory location assigned to the second application, the second memory location including a second flag;
   wherein the metadata region includes metadata, the metadata indicating that data being communicated between the first application and the second application can be found in a particular location in the data region, the metadata further indicating how the data is to interpreted by the first application and the second application;
   wherein the first application has read and write access to the entire metadata region, and wherein the second application has read-only access to the entire metadata region;
   wherein the first flag is settable by the first application, but not the second application, to indicate via an interrupt or polling of the first memory location by the second application that the memory is ready to be accessed by the second application;
   wherein setting of the first flag causes the second application to read the metadata in the metadata region and, based on the metadata, read the data from the particular location in the data region or write the data to the particular location in the data region; and wherein the second flag is settable by the second application, but not the first application, to indicate via an interrupt or polling of the second memory location by the first application that the second application has finished reading the data from or writing the data to the particular location in the data region.

5. The computer system of claim 4, wherein the data comprises data sent from the first application to the second application, and wherein the metadata is specified by the first application.

6. The computer system of claim 4, wherein the data comprises data sent from the second application to the first application, and wherein the metadata is specified by the first application.

7. The computer system of claim 4, wherein the data corresponds to a data stream.

8. The computer system of claim 7, wherein the metadata configures the memory for half-duplex or full-duplex streaming of the data.

9. The computer system of claim 8, wherein the metadata indicates that the data region includes a first sub-region for streaming a first portion of the data, and wherein the metadata further indicates that the data region includes a second sub-region for streaming a second potion of the data.

10. The computer system of claim 4, wherein the metadata includes a key and a value, the key indicating that the value contains a pointer to the location in the data region, and wherein the key is stored in the metadata region in association with the value.

11. The computer system of claim 10, wherein the metadata further indicates an end of the metadata region and how many keys are in the metadata region.

12. A computer-implemented method, comprising:
configuring, by a first application executing on a computer system, a memory for communicating data between the first application and a second application executing on the computer system, wherein the configuring of the memory comprises writing, by the first application, metadata to a metadata region of the memory, the metadata indicating that the data can be found in a first location in a data region of the memory, the metadata further indicating how the data is to be interpreted by the first application and the second application, wherein the first application has read and write access to the entire metadata region, and wherein the second application has read-only access to the entire metadata region;

after the writing of the metadata, setting, by the first application, a first flag in a memory location assigned to the first application, wherein the setting of the first flag indicates to the second application that the memory is ready to be accessed by the second application, and wherein the setting of the first flag causes the second application to read the metadata in the metadata region and, based on the metadata, read the data from the first location in the data region or write the data to the first location in the data region;

receiving, by the first application, an indication that the second application has finished reading the data from or writing the data to the first location in the data region, wherein the indication is based on setting of a second flag in a memory location assigned to the second application;

after receiving the indication that the second application has finished reading the data from or writing the data to the first location in the data region, updating, by the first application, the metadata to indicate a second location that is different from the first location; and after the updating of the metadata, setting, by the first application, the first flag a second time, wherein the setting of the first flag a second time causes the second application to read additional data from or write additional data to the second location based on the updated metadata.

13. The computer-implemented method of claim 12, wherein the data is read from or written to a plurality of memory locations, and wherein a boundary of the plurality of memory locations is determined based on the first location as indicated by the metadata.

14. The computer-implemented method of claim 13, wherein the boundary is determined to begin immediately after the metadata region and end at the first location.

15. The computer-implemented method of claim 12, wherein the data comprises a first set of data communicated between the first application and the second application and a second set of data communicated between the first application and the second application, wherein the first location corresponds to a location of the first set of data, and wherein the metadata further indicates a second location corresponding to a location of the second set of data.

16. The computer-implemented method of claim 12, wherein the metadata includes a key and a value, the key indicating that the value contains a pointer to the first location in the data region, the key further indicating how the data is to be interpreted by the first application and the second application.

* * * * *